(12) United States Patent
Oka et al.

(10) Patent No.: US 11,579,700 B2
(45) Date of Patent: Feb. 14, 2023

(54) DISPLAY APPARATUS

(71) Applicant: Japan Display Inc., Tokyo (JP)

(72) Inventors: Shinichiro Oka, Tokyo (JP); Michiaki Sakamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/446,873

(22) Filed: Sep. 3, 2021

(65) Prior Publication Data

US 2021/0397262 A1  Dec. 23, 2021

Related U.S. Application Data

(63) Continuation of application No. PCT/JP2020/000972, filed on Jan. 15, 2020.

(30) Foreign Application Priority Data

Mar. 6, 2019  (JP) .............................. JP2019-040110

(51) Int. Cl.
   *G06F 3/01*      (2006.01)
   *G06F 3/041*     (2006.01)
   *B06B 1/00*      (2006.01)

(52) U.S. Cl.
   CPC ............... *G06F 3/016* (2013.01); *B06B 1/00* (2013.01); *G06F 3/0412* (2013.01); *G06F 3/0416* (2013.01)

(58) Field of Classification Search
   CPC ...... G06F 3/016; G06F 3/03547; G06F 3/041; G06F 3/0412; G06F 3/0416; G06F 1/1605; G06F 1/1626; G02F 1/1333; G02F 1/133308; G02F 1/13338; B06B 1/00; B06B 1/02; G09F 9/00
   See application file for complete search history.

(56) References Cited

U.S. PATENT DOCUMENTS

| | | | |
|---|---|---|---|
| 2005/0024342 A1* | 2/2005 | Young ................... | B60K 35/00 345/173 |
| 2005/0208709 A1* | 9/2005 | Imai ........................ | G06F 3/041 438/118 |
| 2008/0084384 A1 | 4/2008 | Gregorio et al. | |

(Continued)

FOREIGN PATENT DOCUMENTS

| | | |
|---|---|---|
| JP | 2007-094993 A | 4/2007 |
| JP | 2010-506499 A | 2/2010 |

OTHER PUBLICATIONS

International Search Report dated Mar. 31, 2020 in PCT/JP2020/000972 filed on Jan. 15, 2020, 2 pages.

*Primary Examiner* — Ryan A Lubit
(74) *Attorney, Agent, or Firm* — Maier & Maier, PLLC

(57) ABSTRACT

A display apparatus includes: a display panel; an enclosure enclosing the display panel; a cover member covering a front surface of the display panel; an actuator connected to the cover member and having a function of applying vibration to the cover member; and a viscous body arranged between the display panel and the cover member. The viscous body is bonded to the display panel and the cover member, and, when a periodic stress having a vibration frequency of ½ period per second is applied to the viscous body, a dynamic elastic modulus of the viscous body is equal to or lower than $1\times10^{-3}$ of Young's modulus of the viscous body.

18 Claims, 12 Drawing Sheets

(56) References Cited

U.S. PATENT DOCUMENTS

Figure 1:
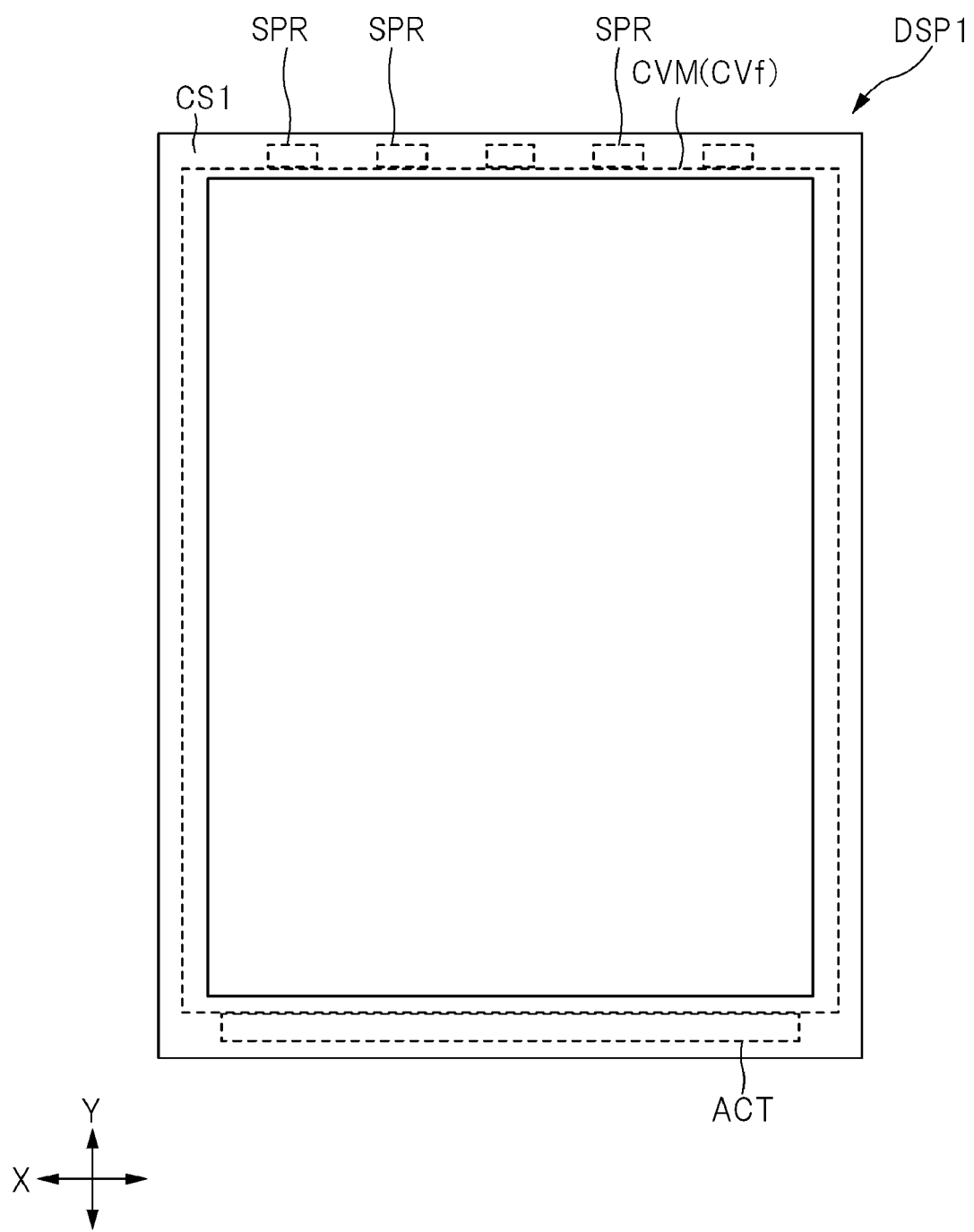

| | | | |
|---|---|---|---|
| 2010/0231540 A1* | 9/2010 | Cruz-Hernandez | G06T 15/04 |
| | | | 345/173 |
| 2014/0104047 A1* | 4/2014 | Bolzmacher | G06F 3/041 |
| | | | 340/407.2 |
| 2015/0153594 A1* | 6/2015 | Sato | G02F 1/13338 |
| | | | 349/122 |
| 2017/0029671 A1* | 2/2017 | Sawanobori | G02F 1/13338 |
| 2018/0190086 A1* | 7/2018 | Alghooneh | G06F 3/016 |
| 2019/0385420 A1* | 12/2019 | Khoshkava | F16F 15/005 |

\* cited by examiner

DISPLAY APPARATUS

CROSS-REFERENCE TO RELATED APPLICATION

The present application is a continuation of International Application No. PCT/JP2020/000972 filed on Jan. 15, 2020, and claims priority to Japanese Patent Application No. 2019-040110 filed on Mar. 6, 2019, the disclosure of which is incorporated herein by reference.

TECHNICAL FIELD OF THE INVENTION

The present invention relates to a technique of a display apparatus, and relates to a technique of transmitting a sense of touch to a user.

BACKGROUND OF THE INVENTION

Each of a Patent Document 1 (Japanese Patent Application Laid-Open Publication No. 2007-94993) and a Patent Document 2 (Japanese Patent Application Laid-Open Publication No. 2010-506499) describes a display apparatus having a function of transmitting a sense of touch to a user by vibrating a touch panel.

RELATED ART DOCUMENTS

Patent Documents

Patent Document 1: Japanese Patent Application Laid-Open Publication No. 2007-94993
Patent Document 2: Japanese Patent Application Laid-Open Publication No. 2010-506499

SUMMARY OF THE INVENTION

There is a technique of making the user recognize a sense of click by vibrating a display apparatus when a finger of the user or others touches a part of the display apparatus. In a display apparatus that vibrates a cover member covering a display panel, it is necessary to suppress the transmission of the vibration of the cover member to the display panel. However, arrangement of an air layer between the display panel and the cover member becomes a cause of reduction in an optical property of the display apparatus.

A purpose of the present invention is to provide a technique of improving a performance of the display apparatus.

A display apparatus according to one embodiment of the present invention includes: a display panel having a first surface, a second surface opposite to the first surface, and a side surface crossing the first surface and the second surface; an enclosure enclosing the display panel; a cover member having a third surface facing the first surface of the display panel and a fourth surface opposite to the third surface so as to cover the first surface of the display panel; an actuator connected to the cover member and having a function of applying vibration to the cover member; and a viscous body arranged between the first surface of the display panel and the third surface of the cover member. When a periodic stress having a vibration frequency of ½ period per second is applied to the viscous body, a dynamic modulus of elasticity of the viscous body is equal to or lower than $1 \times 10^{-3}$ of Young's modulus of the viscous body.

A display apparatus according to another embodiment of the present invention includes: a display panel having a first surface, a second surface opposite to the first surface, and a side surface crossing the first surface and the second surface; an enclosure enclosing the display panel; a cover member having a third surface facing the first surface of the display panel and a fourth surface opposite to the third surface so as to cover the first surface of the display panel; an actuator connected to the cover member and having a function of applying vibration to the cover member; and a viscous body arranged between the first surface of the display panel and the third surface of the cover member. The viscous body has fluidity when the actuator operates while the viscous body does not have the fluidity when the operation of the actuator stops.

BRIEF DESCRIPTIONS OF THE DRAWINGS

Figure 2:
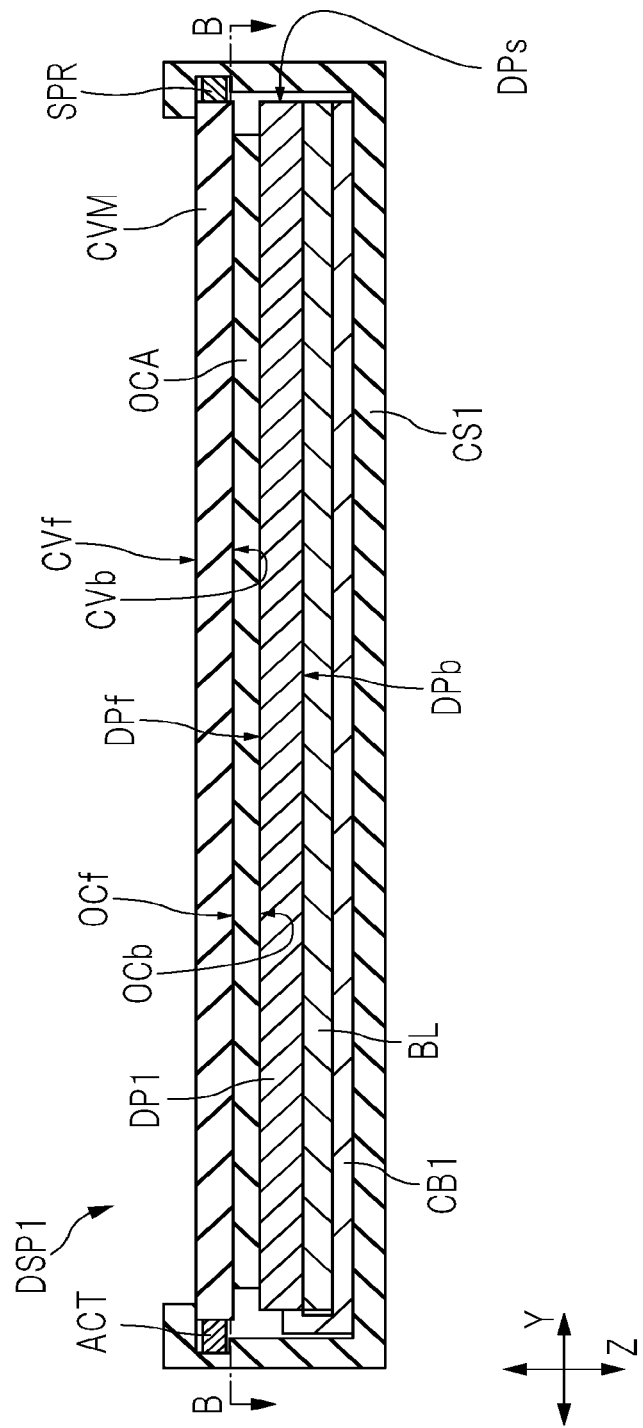
Figure 3:
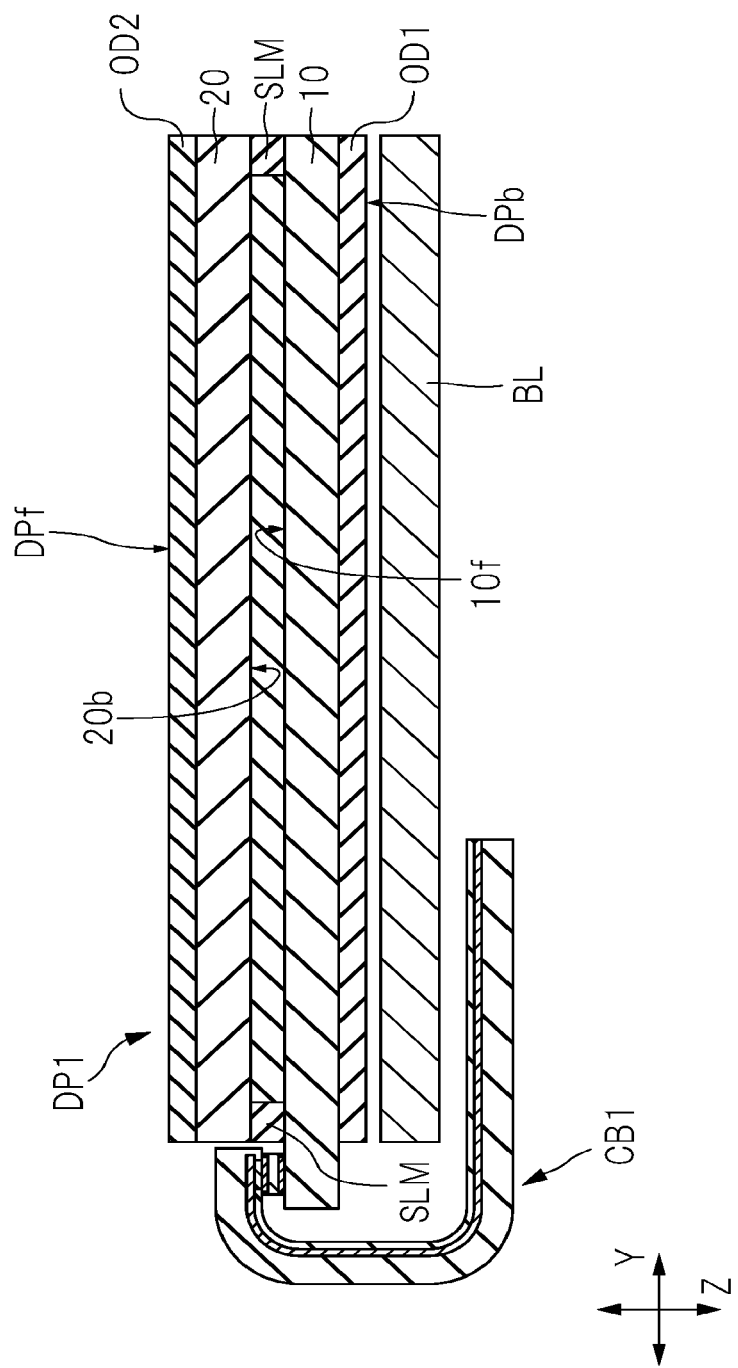
Figure 4:
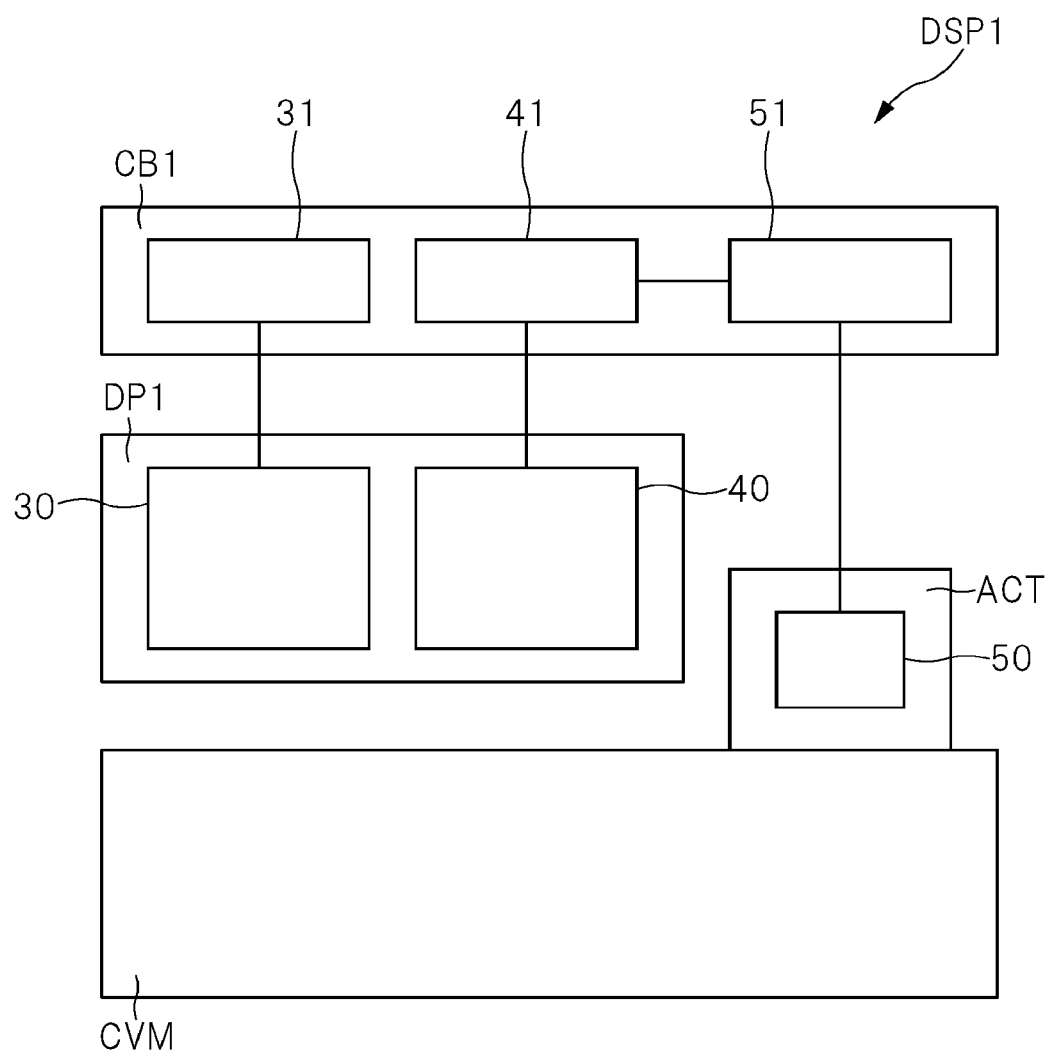
Figure 5:
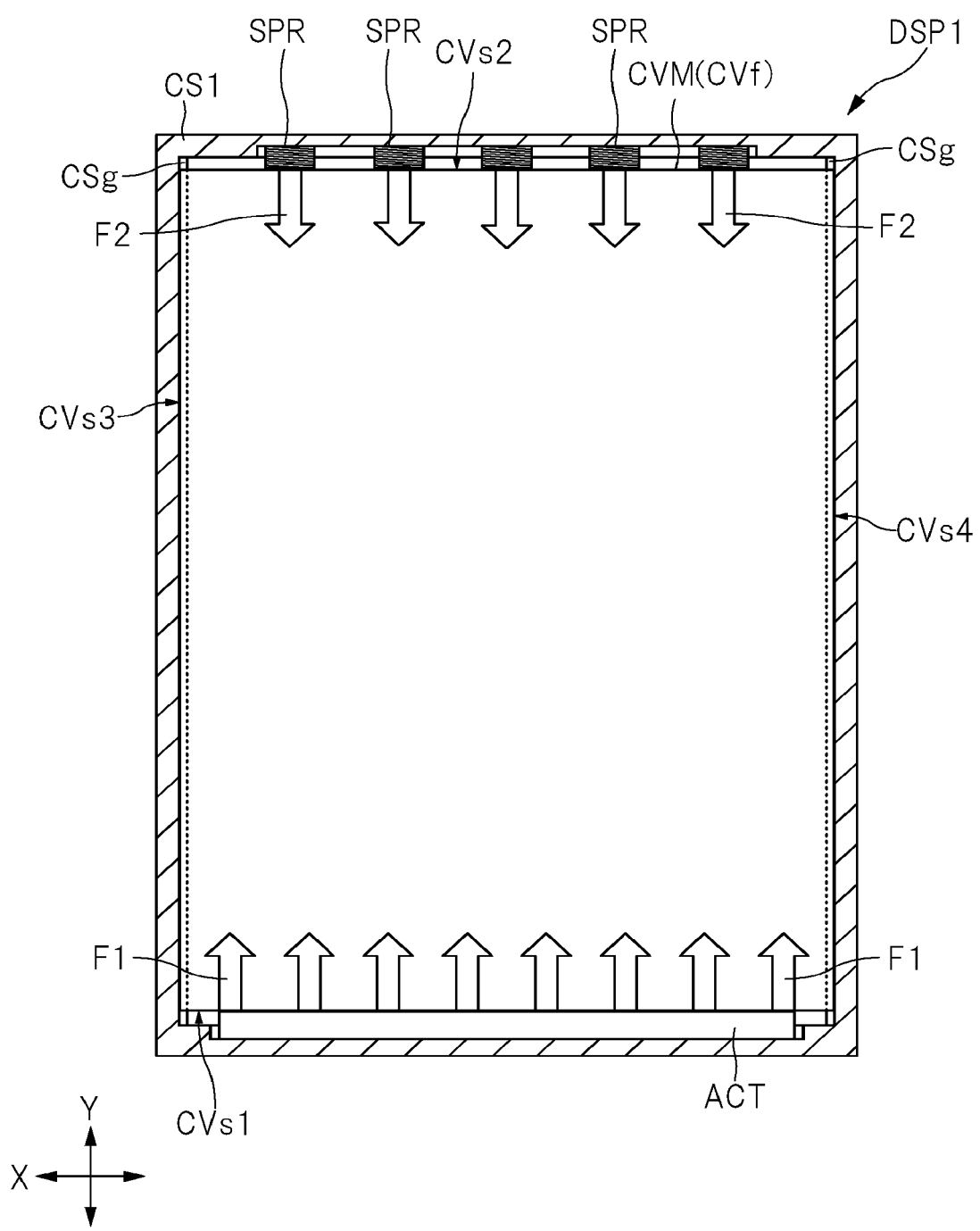
Figure 6:
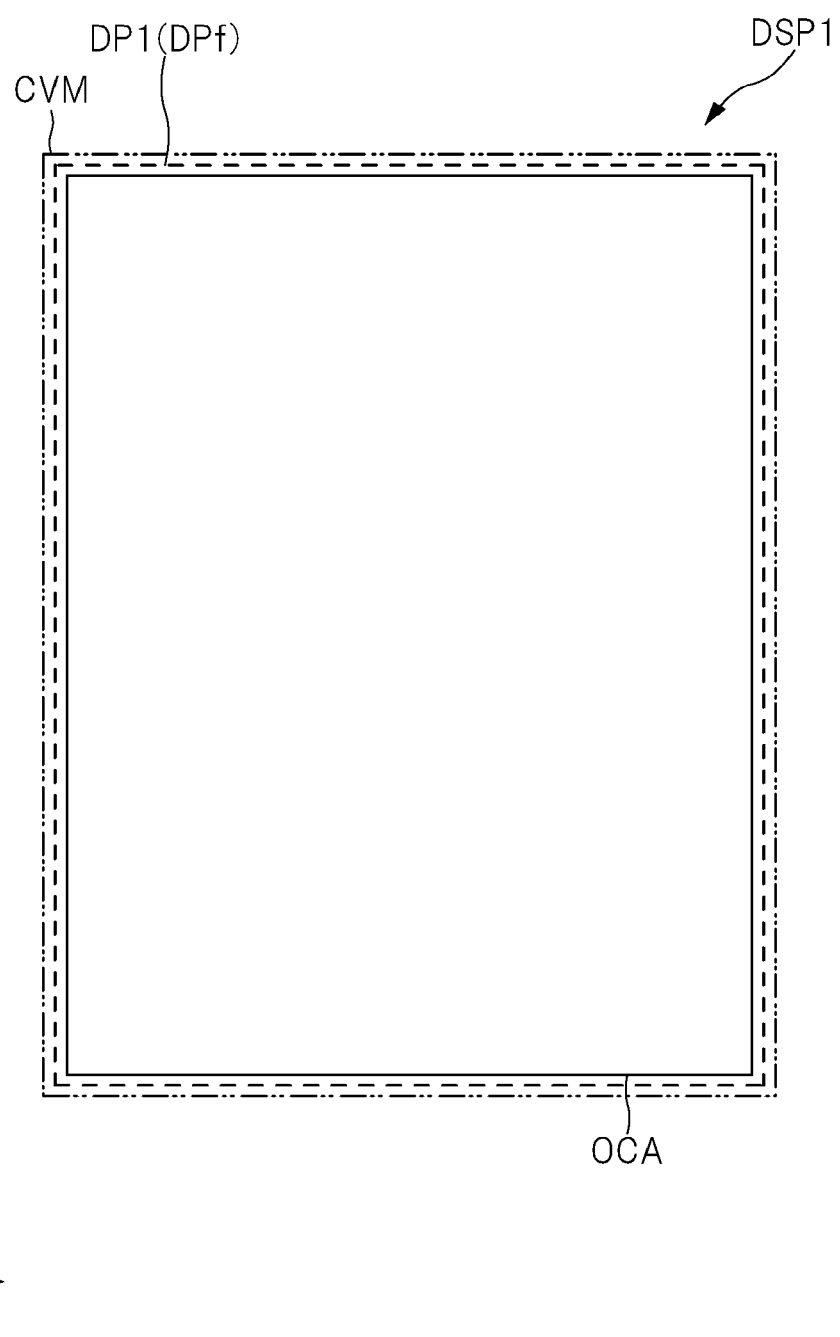
Figure 7:
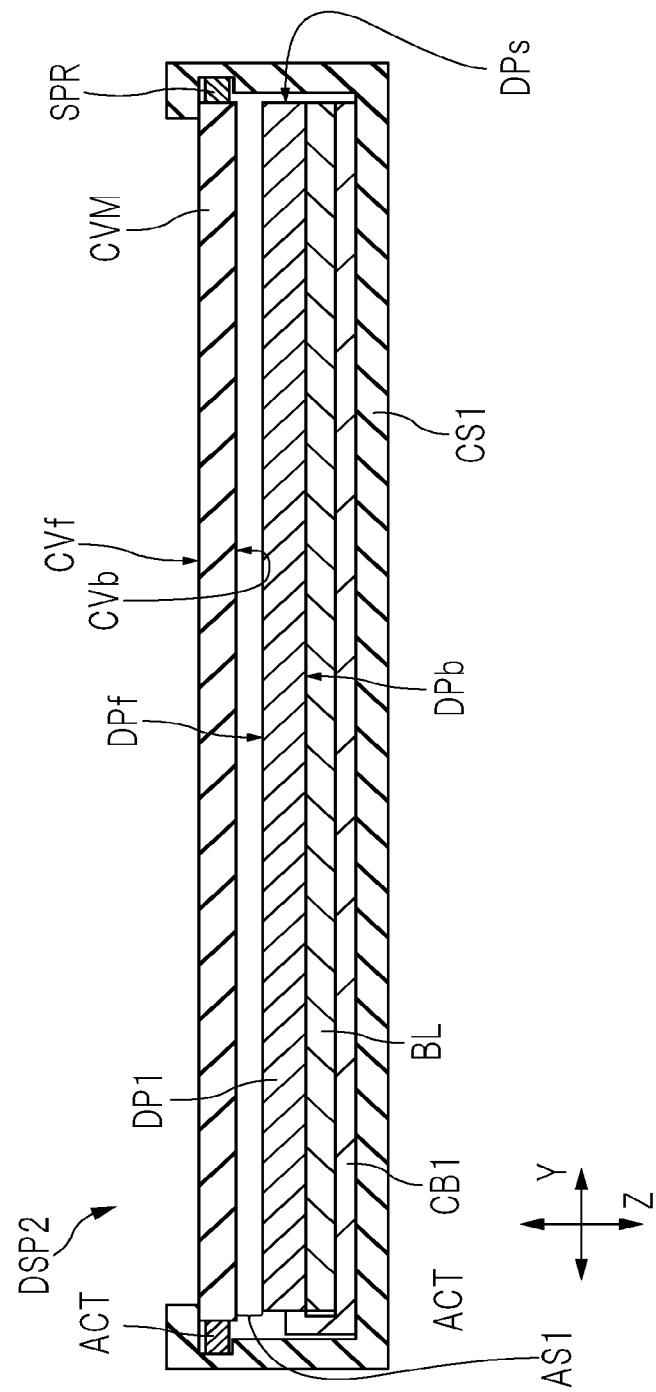
Figure 8:
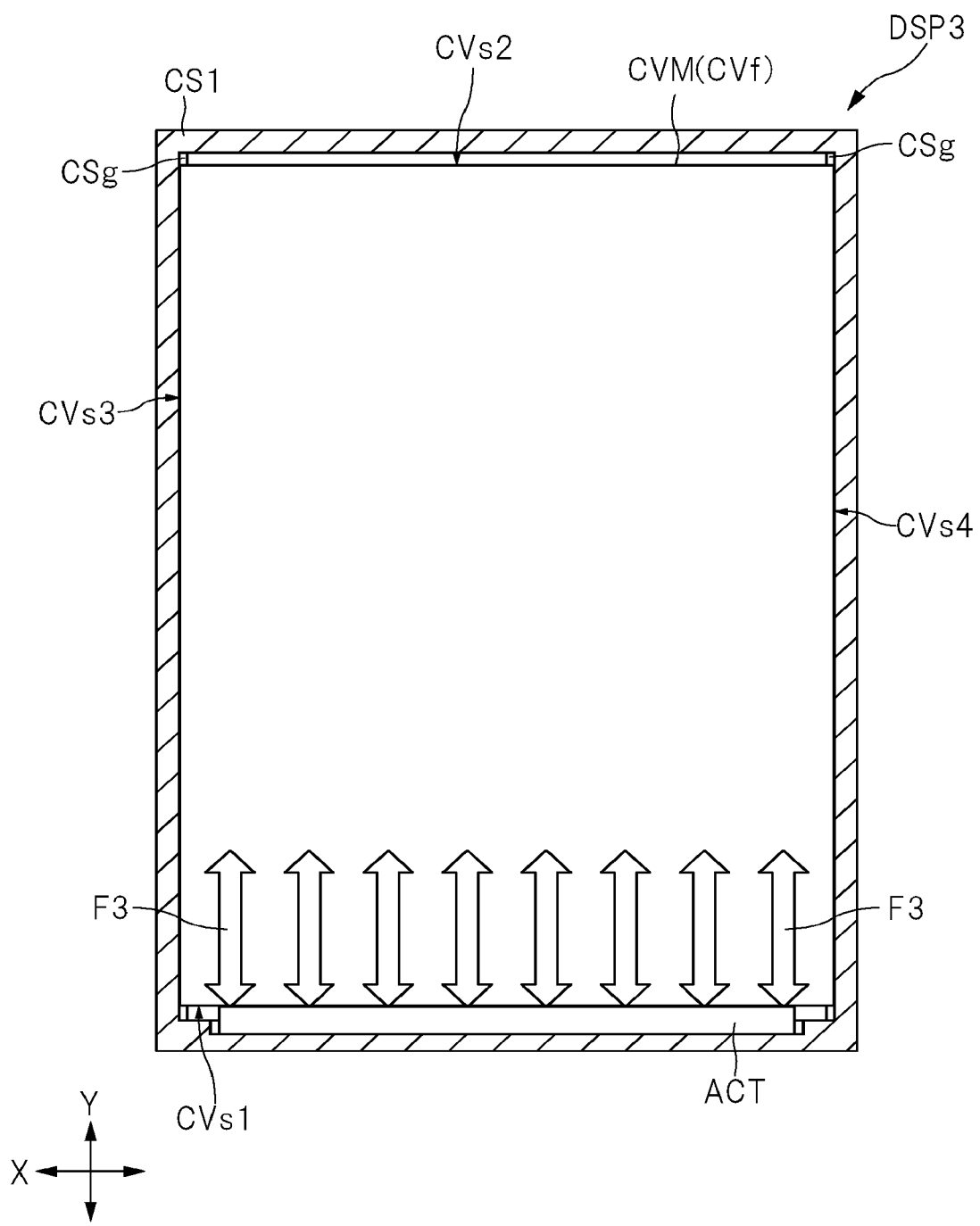
Figure 9:
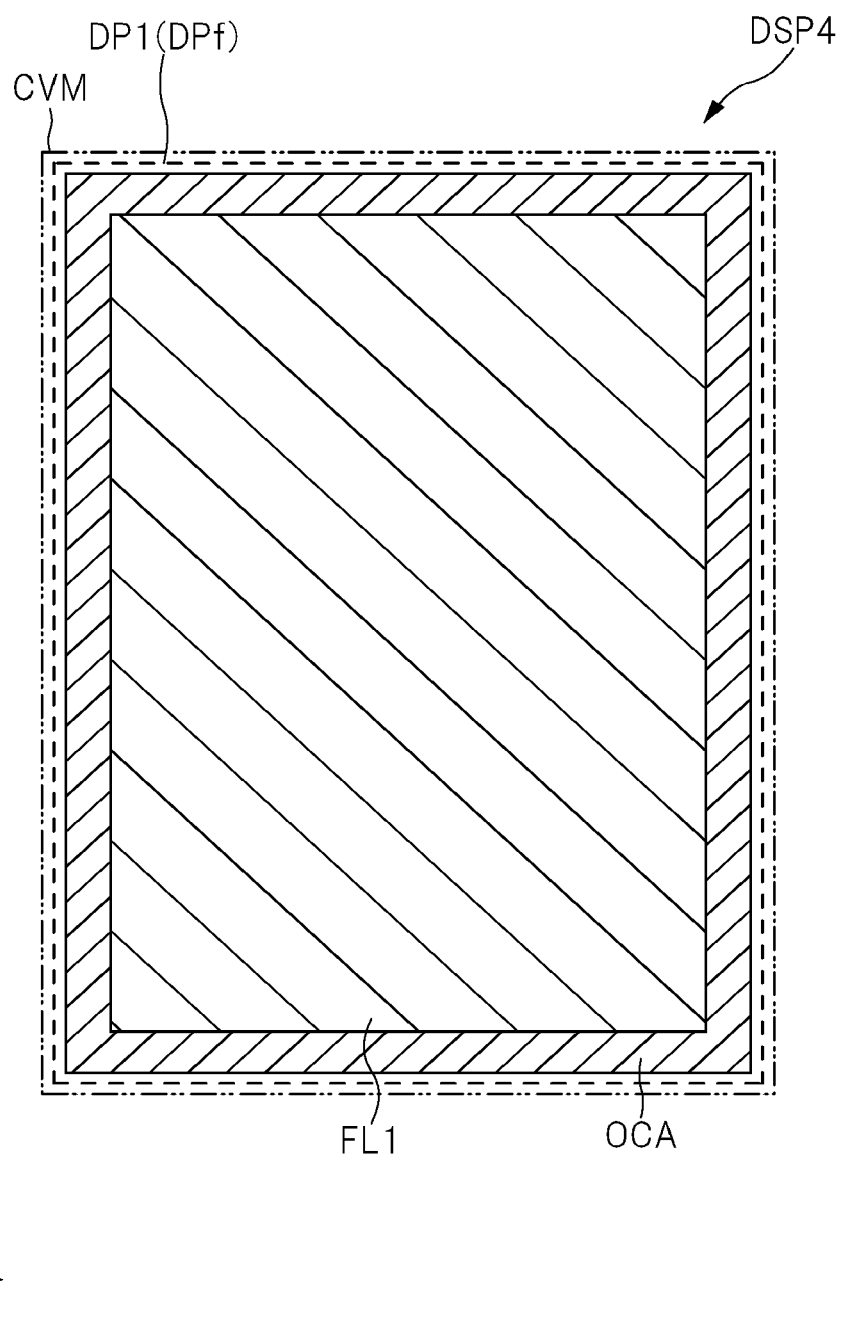
Figure 10:
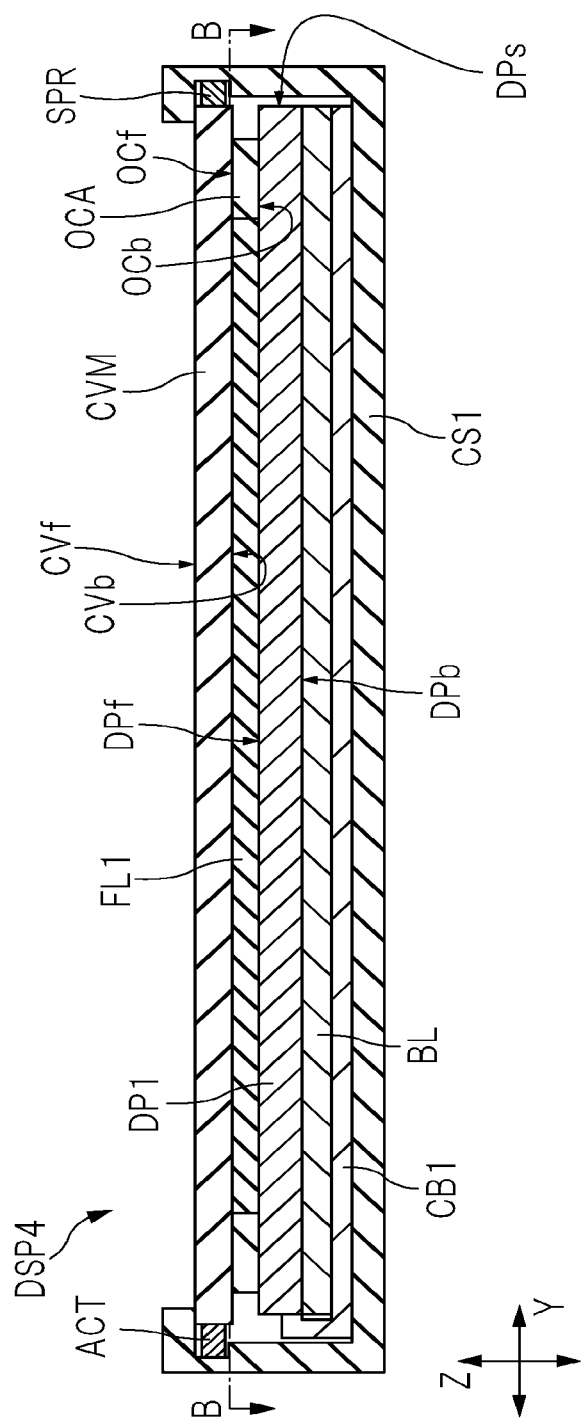
Figure 11:
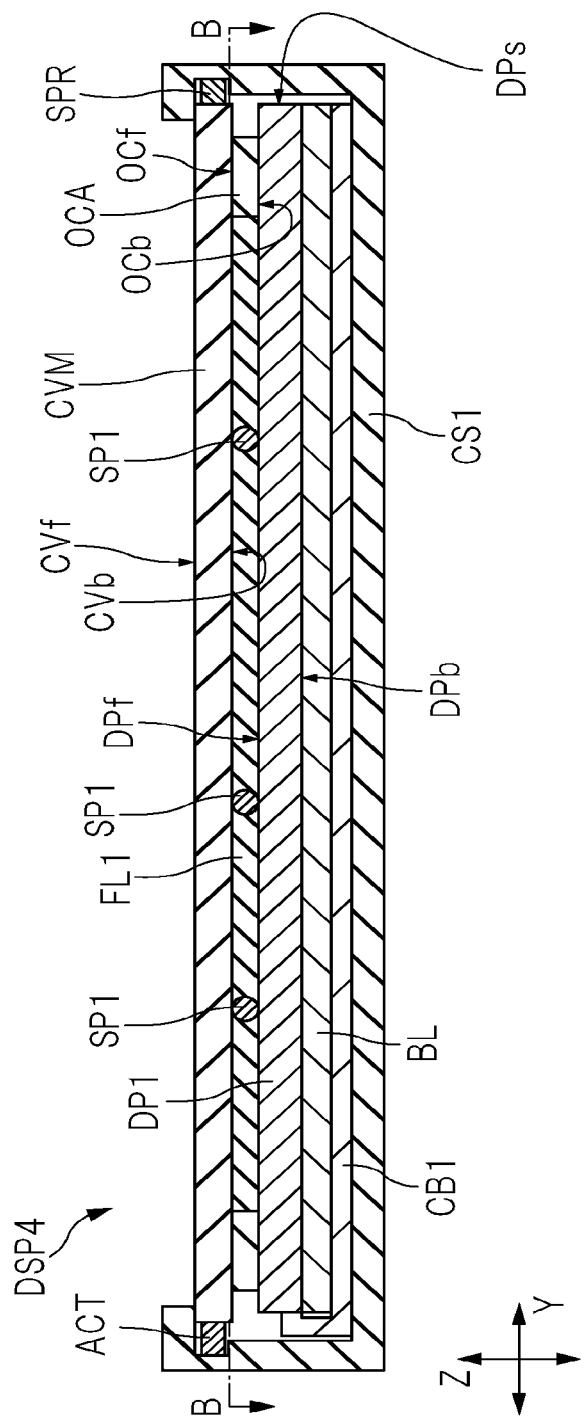
Figure 12:
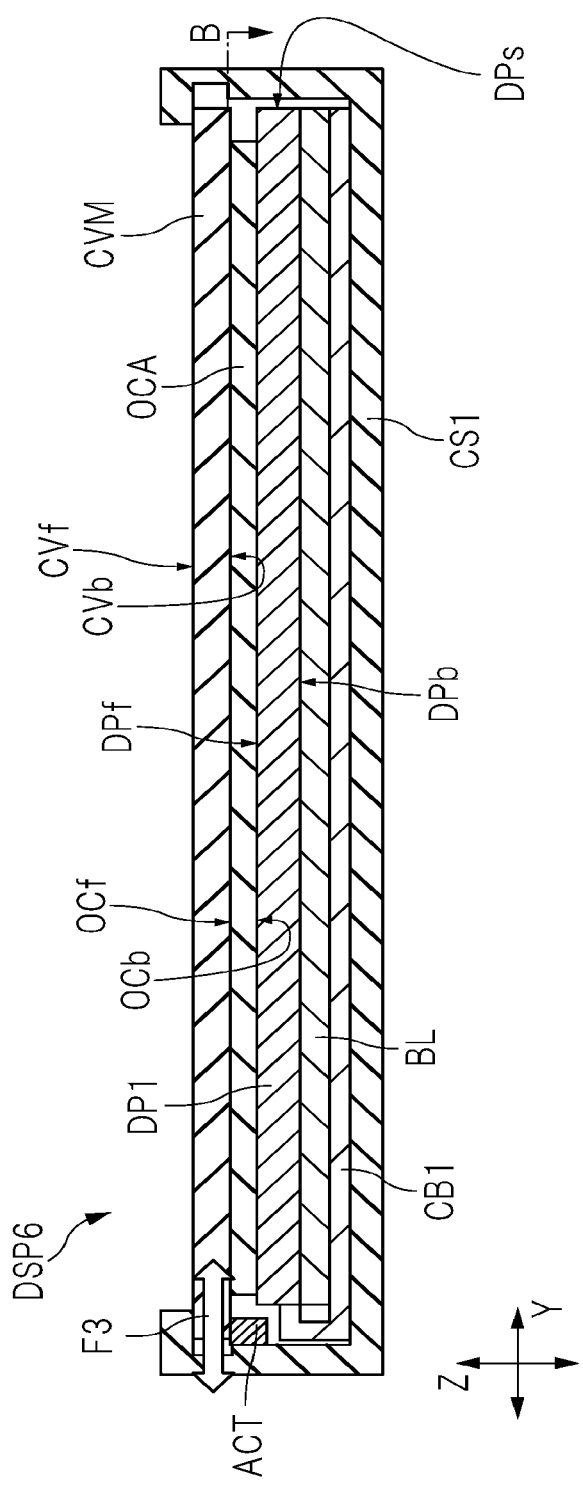

FIG. 1 is a plan view of a region of a display surface showing one example of a display apparatus according to one embodiment;
FIG. 2 is a cross-sectional view taken along a line A-A of FIG. 1;
FIG. 3 is a cross-sectional view showing a configuration example of a display panel shown in FIG. 2;
FIG. 4 is a circuit block diagram showing a configuration example of a display function, a touch detection function and an external-force application function included in the display apparatus shown in FIG. 1;
FIG. 5 is an explanatory diagram schematically showing a direction of the external force applied from the actuator and the springs shown in FIG. 1;
FIG. 6 is a plan view showing a planar positional relation among the display panel, the viscous body and the cover member shown in FIG. 2:
FIG. 7 is a cross-sectional view showing a configuration example of the display apparatus according to the study example of FIG. 2;
FIG. 8 is an explanatory diagram schematically showing a direction of an external force applied from an actuator of a display apparatus according to a modification example of FIG. 5;
FIG. 9 is a plan view showing a modification example of the display apparatus shown in FIG. 6;
FIG. 10 is a cross-sectional view of the display apparatus shown in FIG. 9;
FIG. 11 is a cross-sectional view showing a modification example of FIG. 10; and
FIG. 12 is a cross-sectional view showing another modification example of FIG. 2.

DESCRIPTIONS OF THE PREFERRED EMBODIMENTS

Hereinafter, each embodiment of the present invention will be described with reference to the accompanying drawings. Note that disclosure shows only one example, and appropriate modification with keeping the concept of the present invention which can be easily anticipated by those who are skilled in the art is obviously within the scope of the present invention. Also, a width, a thickness, a shape, and others of each portion in the drawings are schematically illustrated more than those in an actual aspect in some cases in order to make the description clear. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus having a liquid crystal layer that is an electrooptic layer will been exemplified as the display apparatus for explanation. However, the following techniques explained are applicable to not only the liquid crystal display apparatus but also various modification examples. For example, the electrooptic layer may be a layer including an element having an optical property that is changeable when being applied with electrical energy, such as not only a liquid crystal layer but also an organic luminous element layer, an inorganic luminous element layer, a MEMS (Micro Electro Mechanical Systems) shutter, an electrophoretic element layer or others.

As a method of inputting commands to the display apparatus, a method of detecting a position of an input tool by bringing the input tool such as a finger or a touch pen to the display apparatus is exemplified. In the present application, such an input method is referred to as "touch detection", "touch detection function" or "touch detection method". In order to achieve the touch detection function, a mode of detecting change in an electrostatic capacitance of a capacitance element by using the capacitance element included in the display apparatus is exemplified. Such a mode is referred to as electrostatic capacitance mode. The display apparatus having the touch detection function is referred to as touch panel in some cases.

A display apparatus explained in the following embodiments has a function of making a user recognize a texture (referred to as a sense of click in the present application) as similar to button clicking, when the user touches a touch panel. In the present application, this function is referred to as a sense-of-touch function. In other words, the user recognizes the input of the commands from the contact of the finger or others through the sense-of-touch function included in the display apparatus.

First Embodiment

<Configuration of Display Apparatus>

First, a configuration of the display apparatus will be explained. FIG. 1 is a plan view of a region of a display surface showing one example of the display apparatus according to the present embodiment. FIG. 1 shows outlines of a cover member CVM, a spring SPR and an actuator ACT enclosed in the enclosure CS1 with a dotted line. FIG. 2 is a cross-sectional view taken along a line A-A of FIG. 1. As described later, although a display panel DP1 includes a substrate, a polarizer and others, illustration for these components is omitted in FIG. 2. FIG. 3 is a cross-sectional view showing a configuration example of the display panel shown in FIG. 2. In FIG. 3, illustration for a display circuit and an optical filter layer between a substrate 10 and a substrate 20 is omitted. FIG. 4 is a circuit block diagram showing a configuration example of a display function, a touch detection function and an external-force application function included in the display apparatus shown in FIG. 1.

As shown in FIG. 2, the display apparatus DSP1 includes a display panel having a front surface DPf, aback surface DPb opposite to the front surface DPf, and a side surface DPs crossing the front surface DPf and the back surface DPb. The display apparatus DSP1 includes an enclosure CS1 enclosing the display panel DP1. The display apparatus DSP1 also includes a cover member CVM having a back surface CVb facing the front surface DPf of the display panel DP1 and a front surface CVf opposite to the back surface CVb and covering the front surface DPf of the display panel DP1. The display apparatus DSP1 also includes an actuator ACT connected to the cover member CVM and having a function of applying an external force to the cover member CVM. The display apparatus DSP1 also includes a viscous body OCA arranged between the front surface DPf of the display panel DP1 and the back surface CVb of the cover member CVM.

The display apparatus DSP1 also includes a circuit board CB1 having a circuit for driving the display panel DP1. The display apparatus DSP1 also includes a light source BL for emitting light to the display panel DP1. The light source BL is arranged since the display panel DP1 in the example shown in FIG. 2 is a liquid crystal display panel. However, the light source BL is unnecessary if a self-light-emitting electrooptic layer is arranged as the electrooptic layer.

As shown in FIG. 1, the enclosure CS1 is a case collectively enclosing a plurality of components including the display panel DP1 (see FIG. 2). In a planar view, an opening CSh is formed at a center of the enclosure CS1. Each of the display panel DP1, the cover member CVM, the viscous body OCA, the light source BL, the circuit board CB1, the actuator ACT and the spring SPR shown in FIG. 2 is enclosed inside the opening CSh. At the opening CSh formed in the enclosure CS1, a part of the cover member CVM is exposed from the enclosure CS1. A material of the enclosure CS1 is not particularly limited when having a strength to protect the enclosed members. For example, the enclosure CS1 may be made of a metal or a resin.

The display panel DP1 shown in FIG. 2 is, for example, a liquid crystal display panel. As shown in FIG. 3, the display panel DP1 includes a substrate 10 and a substrate 20 that are bonded to each other so as to face each other through a liquid crystal layer LQ. The substrate 10 and the substrate 20 face each other in a thickness direction of the display apparatus DSP1. The substrate 10 has a front surface 10f facing the liquid crystal layer LQ (and the substrate 20). And, the substrate 20 has a back surface 20b facing the front surface 10f of the substrate 10 (and the liquid crystal layer LQ).

The substrate 10 and the substrate 20 are bonded and fixed to each other through a sealing member SLM arranged in the peripheral region. The sealing member SLM is arranged so as to surround the periphery of the liquid crystal layer LQ. The liquid crystal layer LQ is sealed into a region surrounded by the sealing member SLM. Therefore, the liquid crystal layer LQ is not exposed to the side surface DPs of the display panel DP1 (see FIG. 3).

The display apparatus DSP1 includes an optical element OD1 and an optical element OD2. The optical element OD1 is arranged between the substrate 10 and the light source BL. The optical element OD2 is arranged in the region of the display surface of the substrate 20, in other words, arranged on an opposite side of the substrate 10 across the substrate 20. Each of the optical element OD1 and the optical element OD2 includes at least a polarizer, and may include a phase shift plate (waveplate) if needed. In the example shown in FIG. 3, a layered body of the optical element OD1 to the optical element OD2 configures the display panel DP1. The optical element OD1 has the back surface DPb of the display panel DP1, and the optical element OD2 has the front surface DPf of the display panel DP1. As a modification example of the configuration example shown in FIG. 3, note that, for example, a functional film such as a protection film protecting the optical element OD2 may be formed between the optical element OD2 and the viscous body OCA shown in FIG. 2. In this case, the functional film covering the optical element OD2 has the front surface DPf of the display panel DP1. Similarly, a functional film such as a protection film protecting the optical element OD1 may be formed between the optical element OD1 and the light source BL. In this case, the functional film covering the optical element OD1 has the back surface DPb of the display panel DP1.

Although not illustrated in FIG. 3, a display driving circuit 30 shown in FIG. 4 is formed between the substrate 10 and the liquid crystal layer LQ. And, an optical filter layer is formed between the substrate 20 and the liquid crystal layer LQ. In the optical filter layer, a color filter for controlling a transmittance of visible light and a light-blocking film for blocking the visible light in accordance with a light wavelength band are formed. The light-blocking film is shaped into a grid form in the display region, and a plurality of pixels are partitioned by the light-blocking film.

As shown in FIG. 4, the display apparatus DSP1 includes the display driving circuit 30 for displaying images by driving the liquid crystal layer LQ shown in FIG. 3 and a display controlling circuit 31 for controlling the driving of the display driving circuit 30. In an example shown in FIG. 4, the display driving circuit 30 is formed in the display panel DP1, and the display controlling circuit 31 is formed in the circuit board CB1. However, as a modification example, the display controlling circuit 31 is formed in the display panel DP1 in some cases.

Although not illustrated in FIG. 3, the display driving circuit 30 is formed between the substrate 10 and the liquid crystal layer LQ. The display driving circuit 30 includes a plurality of transistors serving as switching elements, a plurality of signal wirings for supplying an electrical signal to each of the plurality of transistors, a power source wiring for supplying a potential that is necessary for forming an electric field driving the liquid crystal layer LQ and others.

The display apparatus DSP1 also includes a touch-detection driving circuit 40 for driving the touch detection function and a touch-detection controlling circuit 41 for controlling the driving of the touch-detection driving circuit 40. In the example shown in FIG. 4, the touch-detection driving circuit 40 is formed in the display panel DP1, and the touch-detection controlling circuit 41 is formed in the circuit board CB1. However, as a modification example, the touch-detection controlling circuit 41 is formed in the display panel DP1 in some cases.

The touch-detection driving circuit 40 includes at least a plurality of detection electrodes detecting a position to which the finger, the touch pen or others goes close and a plurality of signal wirings transmitting electrical signals from the plurality of detection electrodes to the touch-detection controlling circuit 41. The plurality of detection electrodes are formed, for example, between the optical element OD2 and the substrate 20 shown in FIG. 3 in some cases. The plurality of detection electrodes also function as an electrode contained in the display driving circuit 30 shown in FIG. 4 in some cases. In this case, the plurality of detection electrodes are formed between the substrate 10 and the liquid crystal layer LQ shown in FIG. 3 in some cases. As a modification example of FIG. 4, the plurality of detection electrodes are formed in the cover member CVM in some cases.

The display apparatus DSP1 includes an external-force application driving circuit 50 for driving the actuator ACT and an external-force application controlling circuit 51 for controlling the driving of the external-force application driving circuit 50. In the example shown in FIG. 5, the external-force application driving circuit 50 is formed in the actuator ACT, and the external-force application controlling circuit 51 is formed in the circuit board CB1. However, as a modification example, the external-force application controlling circuit 51 is formed in the display panel DP1 in some cases.

The external-force application controlling circuit 51 is electrically connected to the touch detection controlling circuit 41. Therefore, the actuator ACT can be driven on the basis of a signal of the touch detection. For example, when the finger of the user who inputs the command touches the cover member CVM, the actuator ACT is driven, and the external force is applied to the cover member CVM. The cover member CVM is vibrated by the external force applied from the actuator ACT and an elastic force of the plurality of springs SPR shown in FIG. 1. This vibration is transmitted to the finger of the user, and the user recognizes this vibration as the sense of click.

As described above, the display apparatus DSP1 has the display function of displaying the images and the touch detection function. Also, the display apparatus DSP1 has the sense-of-touch function of making the user recognize the sense of click at the time of touch detection.

<Details of Sense-of-Touch Function>

Next, the sense-of-touch function of the above-described display function, touch detection function and sense-of-touch function will be explained in detail. FIG. 5 is an explanatory diagram schematically showing a direction of the external force applied from the actuator and the springs shown in FIG. 1. As the enclosure CS1 shown in FIG. 5, a cross-sectional view taken along a line B-B of FIG. 2 is illustrated. In other words, the enclosure CS1 shown in FIG. 5 has a cross-sectional view having the same height as that of the back surface CVb of the cover member CVM shown in FIG. 2. Therefore, FIG. 5 illustrates only a sidewall of the enclosure CS1. FIG. 6 is a plan view showing a planar positional relation among the display panel, the viscous body and the cover member shown in FIG. 2. In FIG. 6, in a planar view viewed from the cover member CVM, an outline of the viscous body OCA is illustrated with a solid line, an outline of the display panel DP1 is illustrated with a dotted line, and an outline of the cover member CVM is illustrated with a dashed double-dotted line.

As shown in FIG. 5, the front surface CVf of the cover member CVM has a side CVs1 extending in an X direction and a side CVs2 extending in the X direction and being opposite to the side CVs1. Also, the front surface CVf has a side CVs3 extending in a Y direction crossing (in FIG. 5, orthogonal to) the X direction and a side CVs4 extending in the Y direction and being opposite to the side CVs3. In the example shown in FIG. 4, each length of the side CVs1 and the side CVs2 is shorter than each length of the side CVs3 and the side CVs4.

The actuator ACT of the display apparatus DSP1 is arranged along the side CVs1. On the other hand, each of the plurality of springs SPR of the display apparatus DSP1 is arranged along the side CVs2. The actuator ACT and each of the plurality of springs SPR are fixed to the sidewall of the enclosure CS1.

When the actuator ACT is driven by the external-force application driving circuit 50 (see FIG. 4), the external force F1 that is schematically shown with a plurality of arrows in FIG. 5 is applied to the cover member CVM. In the example shown in FIG. 5, the external force F1 is a force in a direction heading from the side CVs1 of the cover member CVM toward the side CVs2. The cover member CVM that has received the external force F1 moves in the same direction as that of the external force F1. Therefore, each of the plurality of springs SPR that are arranged along the side CVs2 is sandwiched by the cover member CVM and the sidewall of the enclosure CS1, and is compressed. Next, the actuator ACT is turned OFF, and a generation source of the external force F1 is stopped. In this manner, as shown with the plurality of arrows in FIG. 5, the elastic force F2 of the springs SPR is applied to the cover member CVM. The elastic force F2 is a force acting in an opposite direction to the external force F1. The cover member CVM is moved by the elastic force F2 in a direction heading from the side CVs2 of the cover member CVM toward the side CVs1. Next, the actuator ACT is driven (in other words, turned ON) again, and the external force F1 is generated. In the subsequent steps, when the external force F1 and the elastic force F2 are alternately applied to the cover member CVM, the cover member linearly vibrates in the Y direction. A vibration frequency of the cover member CVM is defined by a period of the application of the external force F1. For example, the cover member CVM vibrates in the Y direction at a vibration frequency of about ½ period per second.

A driving principle of the actuator ACT is not limited if the actuator can apply the external force F1 to the cover member CVM. As the actuator ACT, for example, an electromagnetic actuator using an electromagnetic force of a solenoid to operate a movable unit, a piezo actuator using a piezo element, an actuator using a shape-memory alloy element, an electrostatic actuator using an electrostatic attractive force as a driving force or others can be used.

The actuator ACT and the cover member CVM may or may not be bonded to each other. When an end of the movable unit of the actuator ACT is bonded to the cover member CVM while an immovable unit of the actuator ACT is boned and fixed to the enclosure CS1, it is easy to synchronize an operation of the movable unit of the actuator ACT with an operation of the cover member CVM. Even when the movable unit of the actuator ACT is not bonded to the cover member CVM, the movable unit of the actuator ACT and the cover member CVM are brought into contact with each other by the movement of the cover member CVM because of the elastic force F2. However, adoption of a method of vibrating the actuator ACT itself without the usage of the elastic force F2 of the plurality of springs SPR as described later in modification examples needs to fix the movable unit of the actuator ACT to the cover member CVM.

In order to operate the cover member CVM as described above, the cover member CVM cannot be fixed to the enclosure CS1. For example, in the example shown in FIG. 5, a guide rail CSg that supports the cover member CVM is arranged in a long side of the sidewall of the enclosure CS1 (a side along the sides CVs3 and CVs4 of the cover member CVM). The guide rail CSg is formed so as to extend in the Y direction, and the cover member CVM is supported by the enclosure CS1 so as to be movable along the guide rail CSg.

Meanwhile, each of the display panel DP1, the light source BL and the circuit board CB1 shown in FIG. 2 is fixed to the enclosure CS1. The vibrations of these components due to the operation of the actuator ACT become a cause of failure. Therefore, in order to achieve the sense-of-touch function by the vibration of the cover member CVM of the display apparatus DSP1, it is necessary to suppress the transmission of the vibration of the cover member CVM to the display panel DP1.

As a method of suppressing the transmission of the vibration of the cover member CVM to the display panel DP1, a configuration of a display apparatus DSP2 shown as a study example in FIG. 7 is exemplified. FIG. 7 is a cross-sectional view showing a configuration example of the display apparatus according to the study example of FIG. 2.

The display apparatus DSP2 shown in FIG. 7 is different from the display apparatus DSP1 shown in FIG. 2 in that the display panel DP1 and the cover member CVM are not in contact with each other and in that an air layer AS1 intervenes between the display panel DP1 and the cover member CVM.

In the case of the display apparatus DSP2, the cover member CVM is supported by the enclosure CS1 but is not fixed. The air layer AS1 that is a hollow space intervenes between the cover member CVM and a structure made of the display panel DP1, the light source BL and the circuit board CB1. Therefore, when the cover member CVM vibrates, an energy of the vibration is dispersed by the air layer AS1, and is almost not transmitted to the structure including the display panel DP1.

On the other hand, in the case of the display apparatus DSP2, an optical property of the display apparatus DSP2 is reduced by the intervention of the air layer AS1 between the cover member CVM and the display panel DP1. A refractive index in the air layer AS1 is smaller than a refractive index in each component configuring the cover member CVM or the display panel DP1, and is regarded to be nearly 1. Also, the refractive index in the air layer AS1 tends to be changed by an ambient temperature. Therefore, when the air layer AS1 intervenes in the middle of a penetration path of the visible light, the optical property is reduced by the refractive index in the air layer AS1. For example, when the refractive index in the cover member CVM and the refractive index in the air layer AS1 cannot be optically matched with each other at an interface between the cover member CVM and the air layer AS1, the external light is reflected thereon, and a display quality is reduced in some cases. Also, when the refractive indexes cannot be optically matched with each other at an interface between the display panel DP1 and the air layer AS1 or the interface between the cover member CVM and the air layer AS1, the visible light from the display panel DP1 is refracted thereon, and the display quality is reduced in some cases.

Accordingly, as shown in FIG. 2, in the case of the display apparatus DSP1, the viscous body OCA is arranged between the front surface DPf of the display panel DP1 and the back surface CVb of the cover member CVM. The viscous body OCA has a back surface OCb bonded to the front surface DPf of the display panel DP1 and a front surface OCf bonded to the back surface CVb of the cover member CVM. A gap between the front surface DPf of the display panel DP1 and the back surface CVb of the cover member CVM is filled with the viscous body OCA, and the air layer AS1 shown in FIG. 5 does not intervene therebetween.

The viscous body OCA intervenes in the middle of the penetration path of the visible light, and therefore, has an optical property capable of transmitting the visible light. The viscous body OCA also has the following properties. The viscous body OCA has a gel structure in a static state in which the stress is not externally applied. In the state with the gel structure (referred to as a gel state below), the viscous body OCA does not have the fluidity. When the stress is externally applied to the viscous body OCA, the gel structure is broken and changes to a sol structure. In the sol state, the viscous body OCA has the fluidity. When the application of the external stress stops, the gel structure of the viscous body OCA is regenerated, and the viscous body OCA does not have the fluidity again. In a relation with the applied external stress, a switching a phenomenon between the gel state and the sol state is called thixotropy.

The above-described properties of the viscous body OCA can be expressed as follows. In other words, when the periodic stress having the vibration frequency of about ½ period per second is applied to the viscous body OCA, a dynamic elastic modulus of the viscous body OCA is equal to or lower than $1 \times 10^{-3}$ of the Young's modulus of the viscous body OCA. For example, the Young's modulus of the viscous body OCA at the time of no operation of the actuator ACT shown in FIG. 2 is about 2.5 to 3 GPa (gigapascal). On the other hand, at the time of the operation of the actuator ACT so that the periodic stress having the vibration frequency of about ½ period per second is applied to the viscous body OCA, the dynamic elastic modulus of the viscous body OCA is about 3 to 7 GPa.

At the time of no operation of the actuator ACT shown in FIG. 2, the viscous body OCA having the above-described properties is in the gel state and is bonded to each of the cover member CVM and the display panel DP1. At the operation of the actuator ACT shown in FIG. 2, the gel structure of the viscous body OCA is broken, and the viscous body OCA has the fluidity. The viscous body OCA in the sol state is bonded to each of the cover member CVM and the display panel DP1 while having the fluidity, and therefore, the vibration of the cover member CVM is dispersed by the viscous body OCA. As a result, the vibration of the cover member CVM can be suppressed from transmitting to the display panel DP1. According to the study of the present inventors, when the dynamic elastic modulus of the viscous body OCA is equal to or lower than $1 \times 10^{-3}$ of (in other words, equal to or lower than $1/1000$ times) the Young's modulus of the viscous body OCA, the transmission of the vibration can be sufficiently suppressed.

As shown in FIG. 6, the viscous body OCA is arranged so as to cover almost the entire front surface DPf of the display panel DP1. As shown in FIG. 6, strictly speaking, an outer edge of the front surface DPf is exposed from the viscous body OCA. However, at least an effective display region of the display panel DP1 is entirely covered with the viscous body OCA. The viscous body OCA is easier to optically match the refractive index in the cover member CVM with the refractive index in the display panel DP1 than the air layer AS1 shown in FIG. 5. A difference between the refractive index in the viscous body OCA and the refractive index in the cover member CVM is smaller than a difference between the refractive index in the viscous body OCA and a refractive index in vacuum ("light speed in vacuum/light speed in vacuum"=1). The refractive index in the viscous body OCA is, for example, about 1.5 to 1.75. The refractive index in the cover member CVM is about 1.5 to 1.75. Therefore, the case of the display apparatus DSP1 shown in FIG. 2 can more suppress the reduction in the display quality than the case of the display apparatus DSP2 shown in FIG. 5.

Next, a modification example of the display apparatus DSP1 explained with reference to FIGS. 1 to 5 will be explained. FIG. 8 is an explanatory diagram schematically showing a direction of an external force applied from an actuator of a display apparatus according to a modification example of FIG. 5.

A display apparatus DSP3 shown in FIG. 8 is different from the display apparatus DSP1 shown in FIG. 5 in that the plurality of springs SPR shown in FIG. 5 are not arranged. A movable unit of an actuator ACT of the display apparatus DSP3 shown in FIG. 8 has a structure that can reciprocate in the Y direction. In this case, as shown with an arrow in FIG. 8, an external force F3 that periodically reciprocates in the Y direction is applied from the actuator ACT to the cover member CVM. In this case, as described above, the end of the movable unit of the actuator ACT is bonded and fixed to the cover member CVM. And, as shown in FIG. 8, the plurality of springs SPR (see FIG. 5) are unnecessary in the case of the display apparatus DSP3. When the vibration is applied by not the elastic force F2 of the springs SPR (see FIG. 5) but only the operation of the actuator ACT, the period of the vibration is easy to be controlled. Also, when the vibration is applied by only the operation of the actuator ACT, the operation of the cover member CVM is easy to be stabilized.

FIG. 9 is a plan view showing a modification example of the display apparatus shown in FIG. 6. A different hatching is added to each of the viscous body OCA and a fluid FL1 in order to easily recognize each planar shape of the viscous body OCA and the fluid FL1 although FIG. 9 is the plan view. FIG. 10 is a cross-sectional view of the display apparatus shown in FIG. 9. FIG. 10 corresponds to the cross-sectional view shown in FIG. 2. The display apparatus DSP4 shown in FIGS. 9 and 10 is different from the display apparatus DSP1 shown in FIG. 6 in that the viscous body OCA is formed in a frame shape. As shown in FIG. 9, the fluid FL1 is arranged inside a region surrounded by the frame-shaped viscous body OCA. As shown in FIG. 10, the fluid FL1 is sealed inside a space surrounded by the viscous body OCA, the display panel DP1 and the cover member CVM. The fluid FL1 is in contact with the viscous body OCA, the display panel DP1 and the cover member CVM.

The fluid FL1 is a refractive-index matching oil that is adjusted for the optical matching between the refractive index in the cover member CVM and the refractive index in the display panel DP1. A refractive index of the fluid FL1 is adjusted so as not to reflect the external light and not to reflect and disperse the visible light emitted from the display panel DP1. The refractive index of the fluid FL1 is, for example, about 1.5 to 1.75. The refractive index in the cover member CVM is, for example, about 1.5 to 1.75. The refractive index in the fluid FL1 is easier to be adjusted than that of the viscous body OCA. However, the usage of only the fluid FL1 causes its spill into the enclosure CS1. Therefore, it is difficult to selectively arrange the fluid FL1 intervening between the cover member CVM and the display panel DP1.

In the case of the display apparatus DSP4, the viscous body OCA is used as a sealing member for the fluid FL1. The fluid FL1 does not peripherally spill out because of being sealed by the viscous body OCA, and can be kept between the cover member CVM and the display panel DP1. The viscous body OCA is different from a simple adhesive member, and is made of a material that repeatedly switches between the gel state and the sol state as described above. Therefore, by the usage of the viscous body OCA as the sealing member, the vibration of the cover member CVM can be suppressed from transmitting to the display panel DP1 through the sealing member.

If the entire display region of the display panel DP1 is covered with the fluid FL1, the need for the refractive index in the viscous body OCA is smaller in the case of the display apparatus DSP4 than the case of the display apparatus DSP1 shown in FIG. 6. Therefore, a degree of freedom of material options in selection for the material of the viscous body OCA is high.

FIG. 11 is a cross-sectional view showing a modification example of FIG. 10. A display apparatus DSP5 shown in FIG. 11 is different from the display apparatus DSP4 shown in FIG. 10 in that a plurality of spacer members SP1 are arranged so as to disperse in the fluid FL1. Inside a region surrounded by the viscous body OCA included in the display apparatus DSP5, the plurality of spacer members SP1 are arranged so as to disperse in the fluid FL1. Each shape of the plurality of spacer members SP1 is spherical.

The fluid FL1 made of the matching oil has the fluidity, and therefore, is not suitable to be a member for keeping a separate distance between the cover member CVM and the display panel DP1. Accordingly, in the display apparatus DSP5, the plurality of spacer members SP1 are arranged as the member for keeping the separate distance between the cover member CVM and the display panel DP1. The spacer members need to have a strength for keeping the separate distance between the cover member CVM and the display panel DP1. Therefore, a hard material is selected. However, the spacer member SP1 is formed to be spherical, and therefore, even when the cover member CVM vibrates, it is difficult to transmit the vibration to the display panel DP1.

FIG. 12 is a cross-sectional view showing another modification example of FIG. 2. A display apparatus DSP6 shown in FIG. 12 is different from the display apparatus DSP1 shown in FIG. 2 in that the actuator ACT is attached to the back surface CVb of the cover member CVM. A movable unit of the actuator ACT included in the display apparatus DSP6 is bonded and fixed to the back surface CVb of the cover member CVM. An immovable unit of the actuator ACT is fixed to the enclosure CS1. The movable unit of the actuator ACT of the display apparatus DSP6 shown in FIG. 12 has a structure that can reciprocate in the Y direction. In this case, as shown with an arrow in FIG. 12, an external force F3 that periodically reciprocates in the Y direction is applied from the actuator ACT to the cover member CVM. And, as shown in FIG. 12, in the case of the display apparatus DSP3, the plurality of springs SPR (see FIG. 5) are unnecessary. When the vibration is applied by not the elastic force F2 of the springs SPR (see FIG. 5) but only the operation of the actuator ACT, the period of the vibration is easy to be controlled. Also, when the vibration is applied by only the operation of the actuator ACT, the operation of the cover member CVM is easy to be stabilized.

Typical modification examples have been explained below with reference to FIGS. 8 to 12. However, combination of the above-described plurality of modification examples may be applicable.

In the scope of the concept of the present invention, various modification examples and alteration examples could have been easily anticipated by those who are skilled in the art, and it would be understood that these various modification examples and alteration examples are also within the scope of the present invention. For example, the ones obtained by appropriate addition, removal, or design-change of the components to/from/into each of the above-described embodiments by those who are skilled in the art or obtained by addition, omitting, or design-change of the step to/from/into each of the above-described embodiments are also within the scope of the present invention as long as they include the concept of the present invention.

The present invention is applicable to a display apparatus.

What is claimed is:

1. A display apparatus comprising:
a display panel having a first surface, a second surface opposite to the first surface, and a side surface crossing the first surface and the second surface;
an enclosure enclosing the display panel;
a cover member having a third surface facing the first surface of the display panel and a fourth surface opposite to the third surface so as to cover the first surface of the display panel;
an actuator connected to the cover member and having a function of applying an external force to the cover member; and
a viscous body arranged between the first surface of the display panel and the third surface of the cover member,
wherein, when a periodic stress having a vibration frequency of ½ period per second is applied to the viscous body, a dynamic elastic modulus of the viscous body is equal to or lower than $1 \times 10^{-3}$ of Young's modulus of the viscous body.

2. The display apparatus according to claim 1, wherein the display panel is arranged in the enclosure, and the cover member is supported by and not fixed to the enclosure.

3. The display apparatus according to claim 2, wherein the viscous body is formed in a frame shape, a first fluid is arranged inside a region surrounded by the viscous body, and the first fluid is sealed inside a space surrounded by the viscous body, the display panel and the cover member, and is in contact with the viscous body, the display panel and the cover member.

4. The display apparatus according to claim 3, wherein a plurality of spacer members that are arranged so as to disperse in the first fluid are arranged inside the region surrounded by the viscous body, and each of the plurality of spacer members is spherical.

5. The display apparatus according to claim 1, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

6. The display apparatus according to claim 3, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

7. The display apparatus according to claim 2, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

8. The display apparatus according to claim 5, wherein the display apparatus includes a plurality of springs arranged along the second side of the cover member.

9. The display apparatus according to claim 4, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

10. A display apparatus comprising:

a display panel having a first surface, a second surface opposite to the first surface, and a side surface crossing the first surface and the second surface;

an enclosure enclosing the display panel;

a cover member having a third surface facing the first surface of the display panel and a fourth surface opposite to the third surface and covering the first surface of the display panel;

an actuator connected to the cover member and having a function of applying an external force to the cover member; and a viscous body arranged between the first surface of the display panel and the third surface of the cover member, wherein the viscous body has fluidity when the actuator operates while the viscous body does not have the fluidity when the operation of the actuator stops.

11. The display apparatus according to claim 10, wherein the display panel is arranged in the enclosure, and the cover member is supported by and not fixed to the enclosure.

12. The display apparatus according to claim 11, wherein the viscous body is formed in a frame shape, a first fluid is arranged inside a region surrounded by the viscous body, and the first fluid is sealed inside a space surrounded by the viscous body, the display panel and the cover member, and is in contact with the viscous body, the display panel and the cover member.

13. The display apparatus according to claim 12, wherein a plurality of spacer members that are arranged so as to disperse in the first fluid are arranged inside the region surrounded by the viscous body, and each of the plurality of spacer members is spherical.

14. The display apparatus according to claim 13, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

15. The display apparatus according to claim 12, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

16. The display apparatus according to claim 11, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

17. The display apparatus according to claim 10, wherein the cover member has a first side extending in a first direction, a second side extending in the first direction and being opposite to the first side, a third side extending in a second direction crossing the first direction and a fourth side extending in the second direction and being opposite to the third side, and the actuator is arranged along the first side of the cover member, and applies the external force in the second direction.

18. The display apparatus according to claim 17, wherein the display apparatus includes a plurality of springs arranged along the second side of the cover member.

* * * * *